United States Patent [19]

Dupin et al.

[11] Patent Number: 4,746,083

[45] Date of Patent: May 24, 1988

[54] DEVICE FOR EJECTING A LOAD SLUNG UNDER A HIGH-PERFORMANCE AIRCRAFT

[75] Inventors: Gérard Dupin, Clamart; Moise DuPont, Colombes, both of France

[73] Assignee: Avions Marcel Dassault-Breguet Aviation, Vaucresson, France

[21] Appl. No.: 885,571

[22] PCT Filed: Nov. 15, 1985

[86] PCT No.: PCT/FR85/00323

§ 371 Date: Jun. 25, 1986

§ 102(e) Date: Jun. 25, 1986

[30] Foreign Application Priority Data

Nov. 16, 1984 [FR] France ............... 84 17494

[51] Int. Cl.[4] .......................... B64D 1/02
[52] U.S. Cl. .................. 244/137.4; 89/1.54; 89/1.58; 89/1.59
[58] Field of Search ............ 244/118.1, 137.4; 89/1.54, 1.57, 1.58, 1.59, 1.818

[56] References Cited

U.S. PATENT DOCUMENTS

| | | | |
|---|---|---|---|
| 1,847,545 | 3/1932 | Wiley | 89/1.59 |
| 3,010,752 | 11/1961 | Geffuer | 244/137.4 |
| 3,883,097 | 5/1975 | Billot | 244/137 A |
| 4,043,525 | 8/1977 | Jakubowski | 244/137.4 |
| 4,187,760 | 2/1980 | Holt | 244/137.4 |
| 4,187,761 | 2/1980 | Holt et al. | 244/137 A |
| 4,377,103 | 3/1983 | Kovalenko | 244/137 A |
| 4,388,853 | 6/1983 | Griffin et al. | 244/137.4 |
| 4,399,968 | 8/1983 | Stock et al. | 244/137 A |

FOREIGN PATENT DOCUMENTS 2218244  9/1974  France.

Primary Examiner—Galen Barefoot
Attorney, Agent, or Firm—Watson, Cole, Grindle & Watson

[57] ABSTRACT

Device for ejecting a load slung under an aircraft, designed to impart to this load, at the moment of its release, kinematic values controlled as a function of the instantaneous flight parameters of the aircraft at this moment.

A plurality of separate modules (1, 2A, 2B, 4, 10) makes it possible, on the one hand, to execute a longitudinal translational movement (d) of the load (3) to detach it from the members (5) attaching it to the aircraft and, on the other hand, to carry out an accurate adjustment of the angular ejection speed. One of the modules is an energy source (1), such as a bottle of compressed nitrogen. Two other modules are respectively a front fluid jack (2A) and a rear fluid jack (2B), both with a retractable telescopic piston which, when the pressurized gas is supplied to it by the source (1), exerts an ejection force on the load (3).

The invention is used for the release of loads carried by aircraft.

4 Claims, 2 Drawing Sheets

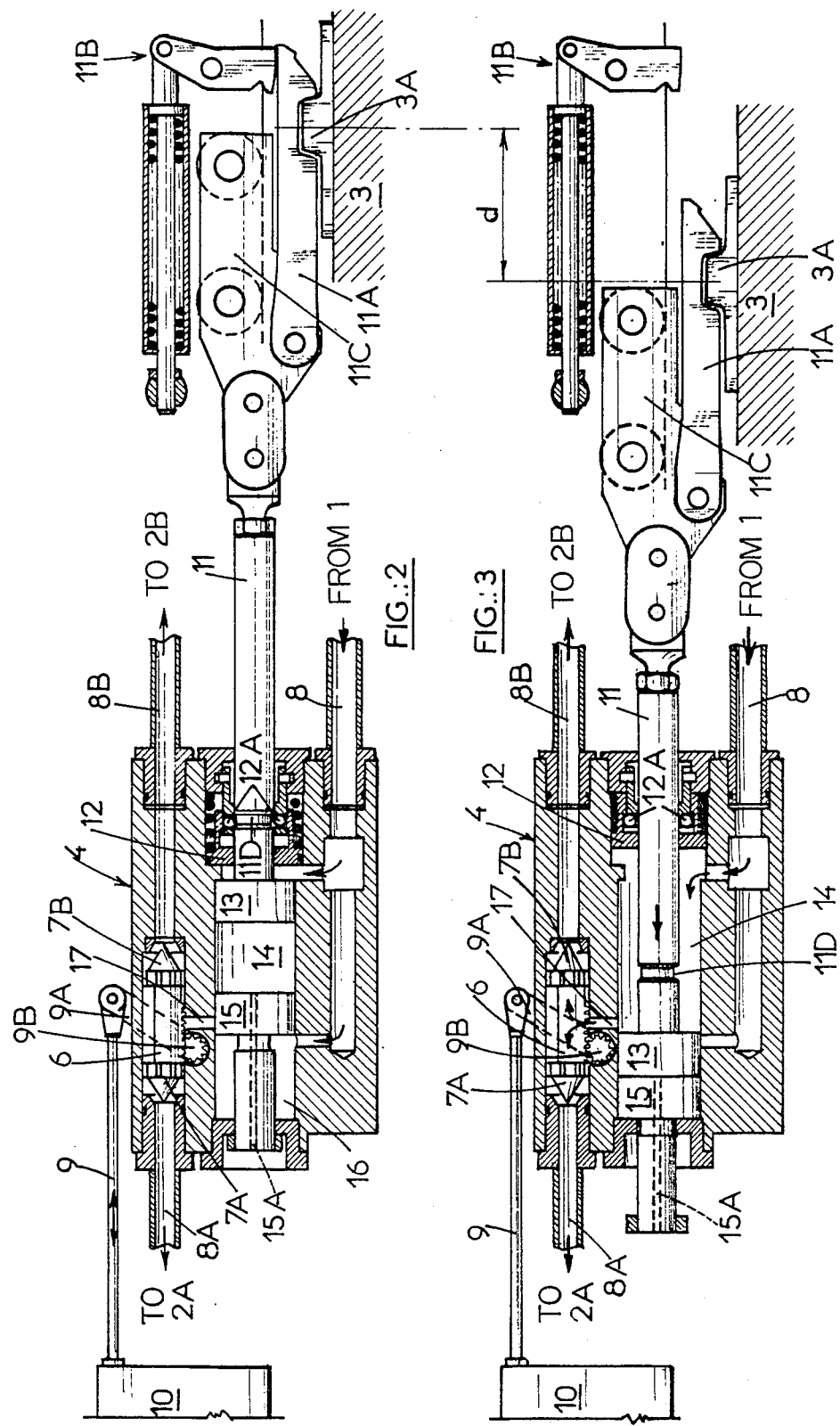

DEVICE FOR EJECTING A LOAD SLUNG UNDER A HIGH-PERFORMANCE AIRCRAFT

BACKGROUND OF THE INVENTION

Modern military aircraft carry various loads slung either under the fuselage or under the wings, these loads usually being releasable in flight, mainly when they are bombs or missiles.

To ensure good separation between the load and the aircraft within a wide range of its flight conditions, it is not sufficient to detach the load: it is also necessary to impart to it a linear ejection speed Vz and an angular ejection speed ωy. These two quantities Vz and ωy are determined by means of ejection tests in a wind tunnel. Their value is not constant, but is a function of the flight parameters: the Mach number, altitude, corrected speed, incidence and load factor. In general, a minimum quantity Vz satisfactory over the entire range can be defined. This is not true of the quantity ωy which varies greatly according to the flight conditions.

The ejection systems existing at the present time in aeronautics have to be adjusted on the ground and consequently only have an optimum setting for a single flight condition at the moment of release.

The object of the present invention is the provision of a modular ejection device which is capable, on the one hand, of ensuring a horizontal translational movement of the missile to disconnect it from its rail before ejection and, on the other hand, of adjusting the angular ejection speed as a function of the flight parameters.

The following description referring to the attached drawings and given by way of non-limiting example will make it easy to understand how the invention can be put into practice.

BRIEF DESCRIPTION OF THE DRAWINGS

FIGS. 2 and 3 are sectional views on a larger scale of an embodiment detail in two operating positions.

DETAILED DESCRIPTION OF THE PREFERRED EMBODIMENT

Figure 1:
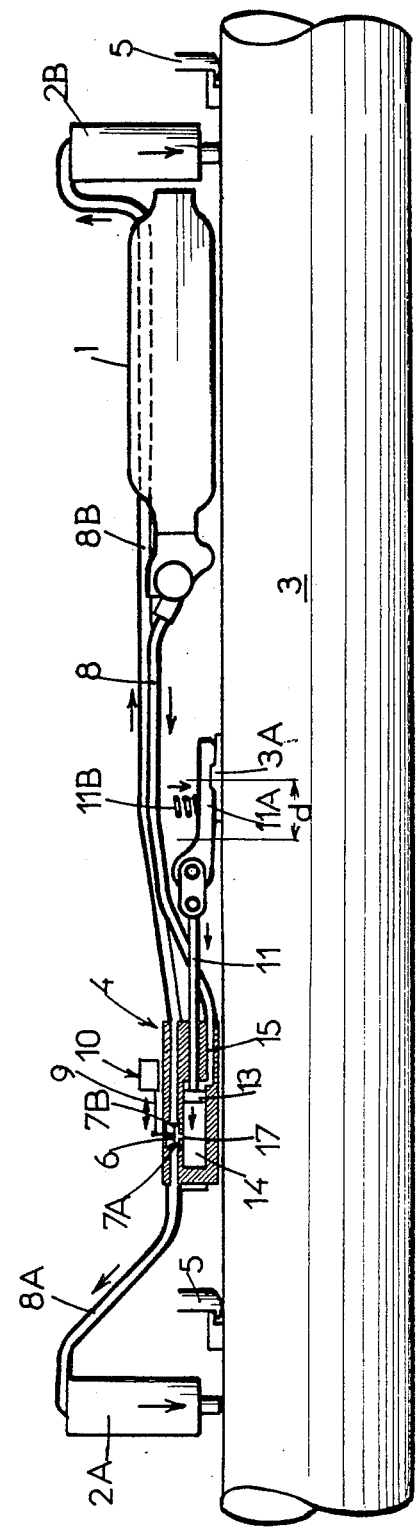
FIG. 1 is a diagrammatic view, in partial longitudinal section, illustrating an embodiment of the present invention.

The ejector device illustrated in FIG. 1 consists of an assembly of separate modules, each having a particular function:

1. An energy source 1, which can be a bottle of nitrogen compressed at a pressure of a few hundred bars and equipped with a pyrotechnic valve, or a pyrotechnic chamber equipped with a gas generator (for example, with standard fuses);
2. A front jack 2A with a retractable telescopic piston which, when the pressurized gas is supplied to its inlet, exerts an ejection force on the load carried 3;
3. A rear jack 2B identical to the front jack 2A;
4. A sequential release/ejection module 4 which is supplied by the energy source 1 and which performs three functions:
   a release function by shifting the load 3 in a translational movement out of its rails 5—5 attaching it to the aircraft (the translational movement will be an acceleration and stop, in order to bring the translational speed of the load 3 back near to zero after it has been removed from its rails 5 and before ejection);
   an ejection adjustment function which, by means of a servo slide valve 6 with a double needle 7A–7B, adjusts the pressure distribution between the front jack 2A and rear jack 2B, to impart to the load 3 an angular pitching speed determined in accordance with the instantaneous flight conditions of the aircraft;
   a sequential function to ensure that the ejection thrust of the jacks 2A, 2B can only be generated when the movement of acceleration and stop is completed.

These various modules are connected by means of pressurized-gas conduits. More specifically, the energy source 1 is connected to the inlet of the sequential module 4 by means of a conduit 8, whilst the outlets of the latter, downstream of the needles 7A, 7B, are connected respectively to the front jack 2A and to the rear jack 2B by means of conduits 8A and 8B. The double-needle servo slide valve 6 is controlled, in turn, by the intervention of a transmission link 9 from a servo-module 10 programmed to integrate the various flight parameters which are appropriately detected.

The mode of operation of the sequential module 4 described above in relation to FIG. 1 will be understood better by also referring now to FIGS. 2 and 3, in which the same reference numerals have been used to designate the same elements.

In addition to these, the drawings also show a rod 11 for pulling the load 3 forwards to detach it from its rails 5, this rod 11 acting on a boss 3A integral with the load 3 by means of an articulated latch mechanism 11A which, at rest (FIG. 2), is kept engaged by an elastic lever stop 11B and which is guided in its longitudinal travel d (FIG. 3) by a carriage 11C. This pull rod 11 interacts with a locking slide 12 with retractable balls 12A engaged with a groove 11D made around the rod 11, this system being shown in the locked position in FIG. 2 and in the unlocked position in FIG. 3.

The pull rod 11 for the load 3, with its ball locking system 12, is integral with a drive piston 13 sliding in a chamber 14 opposite a braking piston 15 perforated with a port 15A.

The pressurized gases coming from the bottle 1, which are released by means of the pyrotechnic valve, are introduced into the head of the chamber 14 via the conduit 8 and first push the ball locking slide 12 of the pull rod 11 to the rear, thereby unlocking the latter. After that, when this rod 11 has been freed in this way, the gases push the drive piston 13 forwards, thereby driving the load 3 in a translational movement, and the displacement of the piston 13 is not impeded by the fluid filling the interspace located between the pistons 13 and 15 because of the port 15A made in the latter.

After a certain stroke, the drive piston 13 comes into contact with the braking piston 15 which it drives in turn, the two pistons 13 and 15 then moving together.

The propellant gases coming from the conduit 8 have, from the outset, been introduced into a braking chamber 16 located behind the braking piston 15. As soon as the latter is pushed back, it begins to perform its braking function, since the gases in the braking chamber 16 are contained. When both the pistons have executed a specific stroke, a transfer duct 17 is exposed and supplies the pressurized gases to the double-needle slide valve 6 which ensures that streams of gas are dispensed towards the ejection jacks 2A, 2B and which at each moment is positioned, according to a control law linked to the flight parameters of the aircraft, by means of the servo-module 10, to which the slide valve 6 is connected via the transmission link 9 completed by a crank 9A integral with a pinion 9B meshing with the slide valve.

The device which has just been described in terms of its organization and mode of operation achieves several technical advantages:

- The modular nature of the system which can be adapted to loads 3 of very different dimensions and to very diverse carrying structures because the geometrical positions of the various modules of the system are not laid down, as they are where a one-piece ejector is concerned.
- A high-performance system, because the instantaneous automatic adjustment in flight of the position of the slide valves 6 controlling the angular ejection speed makes it possible, when a missile is fired during combat maneuvers, to guarantee the best possible trajectory for the missile.
- The system is very light-weight because: the ejection forces only rise in the region of the the ejection jacks 2A,2B, and there is no need for any mechanical control gear, the slide 6 of the distributor is a balanced device which can be controlled with low forces and short strokes, and this is beneficial to the smooth operation of this servo-system,
- The effectiveness of the acceleration/stop system because this device ensures that the missile 3 is removed from its rails 5 as a result of a horizontal movement over a specific travel d according to an acceleration/deceleration law which puts the missile into the ejection position, at a speed near zero, in a minimum amount of time.
- This last characteristic prevents any risk of sub-stantial slipping of the rods of the ejection jacks 2A, 2B when they exert a thrust on the load 3, and thus eliminates the risks of damage to the jack or to the load, and ensures an initial departing trajectory of the missile 3 perpendicular to the missile axis, thereby making it possible to eject a missile semi-housed within the contour of a fuselage without the risk of catching when it comes out, with the sole proviso that a clearance of a length equal to the advancing travel d of the missile (a few centimeters) be provided in the missile pen.

It goes without saying that the embodiment described is only one example and that it could be modified, in particular by substituting technical equivalents, without thereby departing from the scope of the invention.

We claim:

1. A mechanism for detaching an elongated load from support elements located on the underside of an aircraft and for ejecting the elongated load in a controlled manner away from the aircraft, the elongated load having a front end and a rear end, said mechanism comprising
    a front fluid jack module which is attachable to said aircraft and is capable of contacting the front end of said elongated load to move said front end away from said aircraft at a controlled speed,
    a separate rear fluid jack module which is attachable to said aircraft and is capable of contacting the rear end of said elongated load to move said rear end away from said aircraft at a controlled speed, said rear fluid jack module being independently attachable to said aircraft from said front fluid jack module,
    fluid supply means on said aircraft for providing a fluid under pressure,
    a control device which comprises a release/ejection module which is attachable to said aircraft separately from said front fluid jack module and said rear fluid jack module and which includes an inlet channel, two outlet channels, and a double-needle servo-slide valve movable between said two outlet channels to control the ratio of fluid under pressure that flows through each of said two outlet channels from said inlet channel,
    a first supply line connected between said fluid supply means and said inlet channel of said control device,
    second and third supply lines respectively connected between said two outlet channels of said control device and said respective front and said rear fluid jacks, and
    detachment means for detaching said elongated load from said support elements, said detachment means comprising a connection rod having a first end connected to said release/ejection module and a second end, and a latch means attached to the second end of said connection rod, said latch means being cooperable with a boss on said elongated load to axially move said elongated load and cause detachment thereof from said support elements upon axial movement of said connection rod by said release/ejection module,
    said control device operating to control the ratio of fluid under pressure that flows into said second and third supply lines from said first supply line and thus the speed at which said front and rear fluid jacks move said respective front and rear ends of said elongated load away from said aircraft and thus the angular pitching speed imparted to said elongated load.

2. A mechanism as claimed in claim 1, wherein said fluid supply means comprises a tank containing compressed air.

3. A mechanism as claimed in claim 1, wherein said release/ejection module includes a piston chamber and a drive piston movably mounted in said piston chamber, the first end of said connection rod being attached to said drive piston.

4. A mechanism as claimed in claim 1, wherein said release/ejection module includes a braking piston movably mounted in said piston chamber and fluid ducts extending between said inlet channel, said piston chamber and said double-needle servo-slide valve, such that, prior to entering said double-needle servo slide valve, the fluid under pressure from said first supply line will cause said drive piston and said braking piston to move within said piston chamber in such a manner that said connection rod moves axially and then brakes to a full stop.

* * * * *